(12) United States Patent
Zhong

(10) Patent No.: US 9,072,118 B2
(45) Date of Patent: Jun. 30, 2015

(54) METHOD FOR IMPLEMENTING WIFI COMMUNICATION, USER EQUIPMENT AND WIRELESS ROUTING DEVICE

(71) Applicant: Huawei Device Co., Ltd., Shenzhen, Guangdong (CN)

(72) Inventor: Zhen Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 80 days.

(21) Appl. No.: 13/725,523

(22) Filed: Dec. 21, 2012

(65) Prior Publication Data

US 2013/0324087 A1 Dec. 5, 2013

Related U.S. Application Data

(63) Continuation of application No. PCT/CN2012/076407, filed on Jun. 1, 2012.

(51) Int. Cl.
 *H04W 88/06* (2009.01)
 *H04W 12/06* (2009.01)
 *H04L 29/06* (2006.01)

(52) U.S. Cl.
 CPC .............. *H04W 88/06* (2013.01); *H04W 12/06* (2013.01); *H04L 63/0853* (2013.01)

(58) Field of Classification Search
 CPC .................................................. H04L 63/0853
 See application file for complete search history.

(56) References Cited

U.S. PATENT DOCUMENTS

| | | | |
|---|---|---|---|
| 2003/0162529 A1* | 8/2003 | Noblins | 455/411 |
| 2007/0147618 A1 | 6/2007 | Horn | |
| 2009/0287922 A1* | 11/2009 | Herwono et al. | 713/155 |
| 2009/0298467 A1 | 12/2009 | Zohar | |

FOREIGN PATENT DOCUMENTS

| | | |
|---|---|---|
| CN | 101662768 A | 3/2010 |
| CN | 101765057 A | 6/2010 |
| JP | 2006074680 A | 3/2006 |

(Continued)

OTHER PUBLICATIONS

OpenBSC "A5 GSM AT tricks", available online on Jun. 14, 2010, retrieved from https://web.archive.org/web/20100614235827/http://openbsc.osmocom.org/trac/wiki/A5_GSM_AT_tricks on May 30, 2010.*

(Continued)

*Primary Examiner* — Matthew Henning
(74) *Attorney, Agent, or Firm* — Conley Rose, P.C.; Grant Rodolph; Nicholas K. Beaulieu

(57) ABSTRACT

The present invention provides a method for implementing WiFi communication, a wireless routing device and a user equipment. The method includes: receiving, by a wireless routing device and from a user equipment, a request including an authentication request parameter for authenticating the user equipment, sending the authentication request parameter to a subscriber identity module, obtaining an expected authentication result from the subscriber identity module, where the expected authentication result is generated by the subscriber identity module according to the authentication request parameter and an authentication key saved in the subscriber identity module; and sending a response to the request to the user equipment, where the response includes the expected authentication result.

16 Claims, 7 Drawing Sheets

(56) References Cited

FOREIGN PATENT DOCUMENTS

| | | |
|---|---|---|
| JP | 2008258666 A | 10/2008 |
| WO | 2007104909 A1 | 9/2007 |

OTHER PUBLICATIONS

Foreign Communication From a Counterpart Application, European Application No. 12768022.1, Apr. 16, 2014, 5 pages.

Foreign Communication From a Counterpart Application, PCT Application PCT/2012/076407, International Search Report dated on Mar. 7, 2013, 6 pages.

Foreign Communication From a Counterpart Application, PCT Application PCT/CN2012/076407, Written Opinion dated Mar. 7, 2013, 4 pages.

Foreign Communication From a Counterpart Application, Japanese Application No. 2013-520964, Japanese Office Action dated Nov. 26, 2013, 3 pages.

Foreign Communication From a Counterpart Application, Japanese Application No. 2013-520964, English Translation of Japanese Office Action dated Nov. 26, 2013, 3 pages.

* cited by examiner

METHOD FOR IMPLEMENTING WIFI COMMUNICATION, USER EQUIPMENT AND WIRELESS ROUTING DEVICE

CROSS-REFERENCE TO RELATED APPLICATION

This application is a continuation of International Application No. PCT/CN2012/076407, filed on Jun. 1, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a method for implementing WiFi communication, a user equipment and a wireless routing device.

BACKGROUND

With the development of third generation mobile communication (3G) technologies, a novel wireless router is proposed, for example, mobile wireless fidelity (Mobile WiFi). A conventional wireless router accesses the Internet through a network cable interface and generally does not need to move, while the Mobile WiFi mainly uses a 3G wireless technology to access the Internet and is convenient for mobile use.

Currently, some operators not only operate a 3G network, but also may operate a WiFi communication network. The WiFi communication network provides hotspot coverage, which generally may cover a range of tens of meters, with a high speed (e.g., a network speed may reach tens of megabits per second) and low tariff; while the 3G network has wide coverage, which may cover an entire city or country, but with a relatively low speed (e.g., several megabits per second) and high tariff. In an uplink (e.g., from a terminal to a network) direction, the Mobile WiFi is connected to the Internet through the 3G network. In a downlink (e.g., from a network to a terminal) direction, the Mobile WiFi provides WiFi access, so that equipment (e.g., a mobile telephone or a portable computer) having a WiFi client or a WiFi station (WiFi STA) function may be connected to the Mobile WiFi through the WiFi client, or provides a Universal Serial Bus (USB) interface, so that a terminal (e.g., a portable computer) having a USB interface may be connected to the Mobile WiFi through the USB interface, so as to access the Internet indirectly through the Mobile WiFi.

In order to achieve WiFi offload, the operator hopes that after entering a certain WiFi communication network, a user of the Mobile WiFi can automatically switch to access the WiFi communication network through a WiFi hotspot and to access the Internet through the WiFi communication network, and switch back to the 3G network only when no WiFi hotspot exists nearby. Through such an offload technology, the operator may implement centralized coordination of two types of network resources, for example, offload some users from a congested 3G network to the WiFi communication network and save a network access tariff for the users.

A common solution is to add a "WiFi station" module to the Mobile WiFi. In this solution, in the uplink direction, a user equipment accesses the WiFi communication network through the Mobile WiFi and accesses the Internet through the WiFi communication network. However, this solution fails to make full use of the WiFi capability of the user equipment.

SUMMARY

Embodiments of the present invention provide a method for implementing WiFi communication, a wireless routing device and a user equipment, which can make full use of the WiFi capability of the user equipment.

In one aspect, a method for implementing WiFi communication is provided that includes: receiving, by a wireless routing device, a request sent by a user equipment, where the request includes an authentication request parameter for authenticating the user equipment; sending, by the wireless routing device, the authentication request parameter to a subscriber identity module; obtaining, by the wireless routing device, an expected authentication result from the subscriber identity module, where the expected authentication result is generated by the subscriber identity module according to the authentication request parameter and an authentication key saved in the subscriber identity module; and sending, by the wireless routing device, a response to the request to the user equipment, where the response includes the expected authentication result.

In another aspect, a method for implementing WiFi communication is provided that includes: receiving, by a user equipment, an authentication request from a WiFi communication network, where the authentication request includes an authentication request parameter for authenticating the user equipment; sending, by the user equipment, a request to a wireless routing device, where the request includes the authentication request parameter; receiving, by the user equipment and from the wireless routing device, a response to the request, where the response includes an expected authentication result; and sending, by the user equipment, the expected authentication result to the WiFi communication network, so that the WiFi communication network authenticates the user equipment according to the expected authentication result.

In another aspect, a wireless routing device is provided that includes: a receiving module configured to receive a request sent by a user equipment, where the request includes an authentication request parameter for authenticating the user equipment; a sending module configured to send the authentication request parameter to a subscriber identity module and send a response to the request to the user equipment, where the response includes an expected authentication result; and an obtaining module configured to obtain the expected authentication result from the subscriber identity module, where the expected authentication result is generated by the subscriber identity module according to the authentication request parameter and an authentication key saved in the subscriber identity module.

In another aspect, a user equipment is provided that includes: a receiving module configured to receive an authentication request from a WiFi communication network and receive, from a wireless routing device, a response to the request, where the authentication request includes an authentication request parameter for authenticating the user equipment, and the response includes an expected authentication result; and a sending module configured to send a request to the wireless routing device, and send the expected authentication result to the WiFi communication network, so that the WiFi communication network authenticates the user equipment according to the expected authentication result, where the request includes the authentication request parameter.

Through the technical solutions, a wireless routing device may obtain an expected authentication result from a subscriber identity module, and send the expected authentication result to a user equipment, so that the user equipment may use the expected authentication result to access a WiFi communication network, thereby making full use of the WiFi capability of the user equipment.

BRIEF DESCRIPTION OF THE DRAWINGS

To illustrate the technical solutions in the embodiments of the present invention more clearly, the following briefly describes the accompanying drawings needed for describing the embodiments. Apparently, the accompanying drawings in the following description merely show some embodiments of the present invention, and persons skilled in the art may derive other drawings from these accompanying drawings without creative efforts.

DETAILED DESCRIPTION

Figure 1:
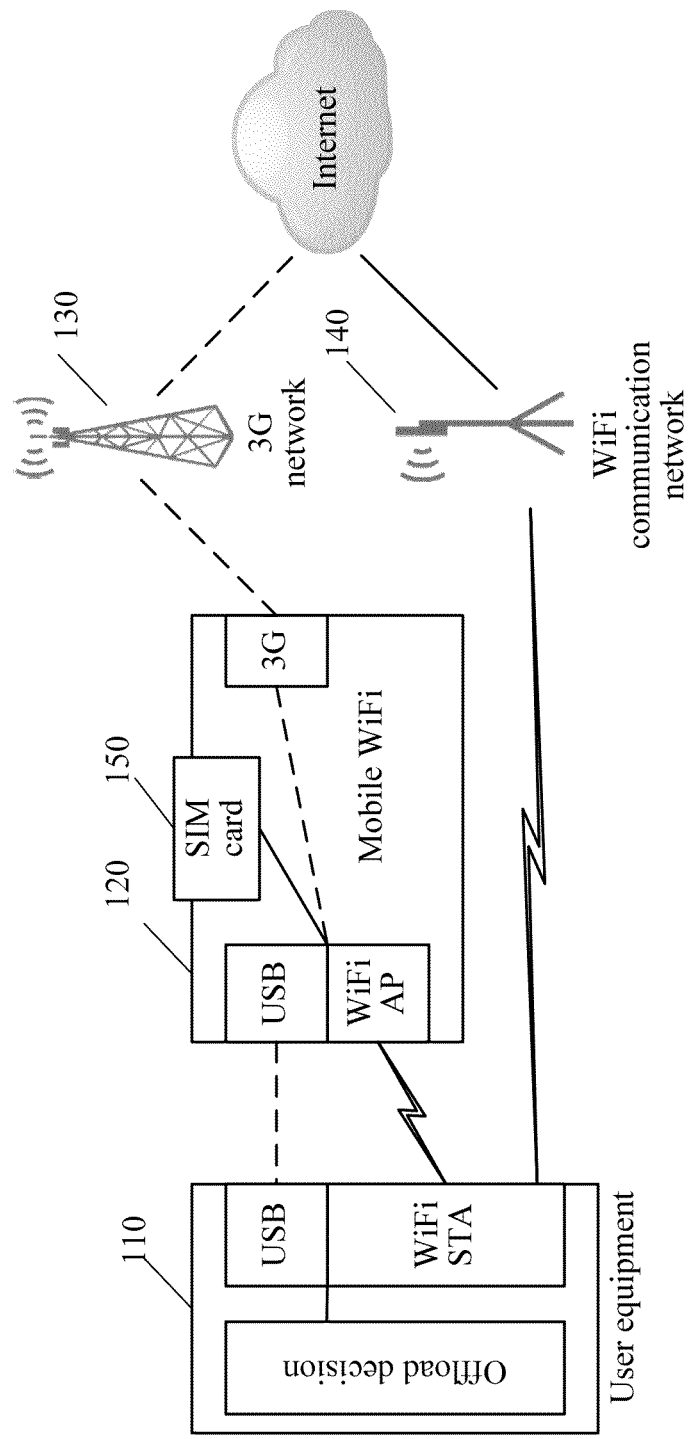
FIG. 1 is a schematic diagram of a communication system according to an embodiment of the present invention.

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative efforts shall fall within the protection scope of the present invention.

It should be understood that, the technical solutions according to the embodiments of the present invention may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system and the like, which is not limited in the embodiments of the present invention; however, for the convenience of description, the embodiments of the present invention are to be illustrated by taking an LTE network as an example.

The embodiments of the present invention may apply to radio networks of different standards. Radio access networks in different systems may include different network elements. For example, network elements of radio access networks in LTE and LTE-A include an evolved NodeB base station (eNodeB or eNB) and network elements of a radio access network in WCDMA include a Radio Network Controller (RNC) and a NodeB base station (NodeB). Similarly, other radio networks such as Worldwide Interoperability for Microwave Access (WiMax) may also use solutions similar to the embodiments of the present invention, except that relevant modules in the base station system may be different, which is not limited in the embodiment of the present invention.

It should be further understood that, in the embodiments of the present invention, a user equipment (UE) includes, but is not limited to, a mobile station (MS) and a mobile terminal, for example, a wireless network card, a mobile telephone, a handset and portable equipment (e.g., a computer). The user equipment may communicate with one or more core networks through a radio access network (RAN). For example, the user equipment may be a mobile telephone (or referred to as a "cellular telephone"), or a computer having a wireless communication function, and the user equipment may also be a portable, pocket, handheld, computer built-in or vehicle mounted mobile device. The user equipment may be a terminal (e.g., a portable computer or a smart phone) having a WiFi STA capability, may access a WiFi communication network of an operator directly, and may not need to have a special subscriber identity module (SIM) card authentication function.

It should be further understood that, in the embodiments of the present invention, a wireless routing device may include a Mobile WiFi, but the embodiments of the present invention are not limited thereto, and any product "connected to a non-WiFi communication network in an uplink direction, connected to other terminals in a downlink direction, and with a built-in WiFi access algorithm," for example, 3G network card or 3G wireless router, may use the present invention.

An "offload decision" software module may be newly added to the Mobile WiFi to implement handover between two uplink networks 3G/WiFi, and during selection of WiFi access, the Mobile WiFi may read SIM card authentication information used for accessing the WiFi communication network. However, this solution fails to make full use of the capability of the user equipment, because the user equipment (e.g., a portable computer or a smart phone) having a WiFi STA capability may access a WiFi communication network of an operator directly and only lacks a special SIM card authentication function.

To solve the above problems, according to the embodiments of the present invention, when implementing the WiFi offload function, the Mobile WiFi does not need to implement an uplink WiFi STA function, but instead, opens a SIM card authentication capability to the user equipment connected with the Mobile WiFi in the downlink direction. In order to implement the WiFi offload function, the user equipment does not need to use the uplink WiFi STA function in the Mobile WiFi, but instead, uses an uplink WiFi STA function of the user equipment to access the WiFi communication network of the operator. The user equipment may read authentication information (e.g., information stored in a SIM card built in the Mobile WiFi) from the Mobile WiFi, and based on the authentication information, access the WiFi communication network of the operator. When the user equipment is handed over from the 3G network to the WiFi communication network of the operator, the Mobile WiFi may also be enabled to enter a hibernation mode with low power consumption and wait to be awakened by the user equipment later.

FIG. 1 is a schematic diagram of a communication system according to an embodiment of the present invention.

The communication system according to the embodiment of the present invention includes a user equipment 110, a Mobile WiFi 120, a 3G network 130 and WiFi communication network 140 that are connected to the Internet, and a SIM card 150 built in the Mobile WiFi 120. Downlink connection modes of the Mobile WiFi 120 may include a USB connection mode and/or a WiFi connection mode, for example, the user equipment 110 may communicate with the Mobile WiFi 120 through a USB interface or perform WiFi communication with the Mobile WiFi 120 through a WiFi STA function of the user equipment and a WiFi Access Point (AP) function of the Mobile WiFi 120. The embodiment of the present invention is not limited thereto, for example, the downlink connection mode may also be a BLUETOOTH, infrared or network cable interface connection mode, that is, the user equipment 110 may communicate with the Mobile WiFi 120 through a BLUETOOTH, infrared or network cable interface.

According to the embodiment of the present invention, when a WiFi offload function is implemented, an offload decision module in the user equipment 110 may cooperate with the Mobile WiFi 120 to access a WiFi communication network 140 of an operator through a WiFi STA function of the user equipment 110, where the user equipment needs to use the SIM card 150 built in the Mobile WiFi 120 to implement authentication. In other words, when the user equipment (e.g., a smart phone or a portable computer) 110 has the WiFi STA function, it may access the WiFi communication network 140 of the operator, and at this time, authentication information (hereinafter also referred to as an expected authentication result) generated by the SIM card 150 built in the Mobile WiFi 120 needs to be read. In other words, the Mobile WiFi 120 not only provides the user equipment 110 with the authentication information generated by the SIM card 150, but may also be responsible for an uplink connection with the 3G network 130 through a 3G interface, but may not need to be responsible for an uplink connection with the WiFi communication network 140. The downlink connection mode of the Mobile WiFi 120 is unchanged, and the Mobile WiFi 120 may be connected to the user equipment 110 through a WiFi AP or USB, and a WiFi offload decision module configured to implement handover between the 3G network 130 and the WiFi communication network 140 may be implemented in the user equipment 110.

Figure 2:
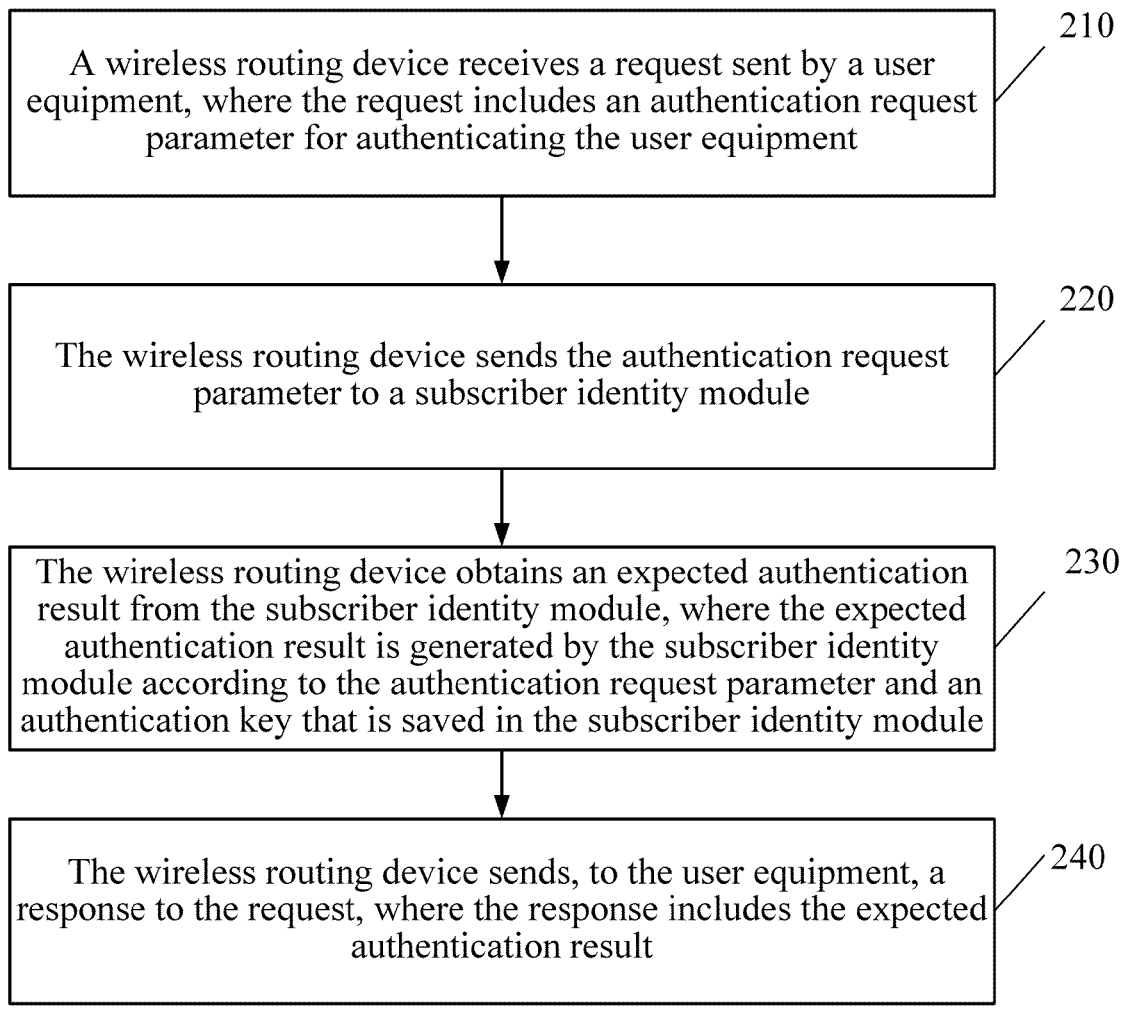
FIG. 2 is a schematic flow chart of a method for implementing WiFi communication according to an embodiment of the present invention.

FIG. 2 is a schematic flow chart of a method for implementing WiFi communication according to an embodiment of the present invention. The method of FIG. 2 is executed by a wireless routing device (e.g., the Mobile WiFi 120 of FIG. 1).

210: A wireless routing device receives a request sent by a user equipment, where the request includes an authentication request parameter for authenticating the user equipment.

For example, the authentication request parameter may be a random number generated by a network side, and used, together with an authentication key saved at a WiFi communication network side and a terminal side (with respect to the network side), for calculating authentication information such as an expected authentication result. If the expected authentication results calculated by the network side and the terminal side are the same, it indicates successful authentication. The authentication request parameter may be used by a WiFi communication network to authenticate the user equipment.

For example, the request may be sent by using an application programming interface, where the application programming interface may include a software interface protocol, including, but not limited to, a Hypertext Transfer Protocol (HTTP) application programming interface, a Hypertext Transfer Protocol over secure socket layer (HTTPS) application programming interface or a Socket application programming interface. The Socket application programming interface is a transmission control protocol (TCP) socket or user datagram protocol (UDP) socket application programming interface. According to the embodiment of the present invention, the user equipment may carry, in the request, the authentication request parameter received from the WiFi communication network and send the request to the wireless routing device.

220: The wireless routing device sends the authentication request parameter to a subscriber identity module.

For example, after receiving the request from the user equipment, the wireless routing device may extract the authentication request parameter from the request and send the authentication request parameter to the subscriber identity module. The subscriber identity module may be built in the wireless routing device and be responsible for generating an expected authentication result according to the authentication request parameter, an authentication key and an authentication algorithm that are saved therein. The wireless routing device may send the authentication request parameter to the subscriber identity module through an attention (AT) command or a self-defined software interface function, to request the subscriber identity module to calculate and return the expected authentication result.

For example, the subscriber identity module may be a SIM card (e.g., a SIM card in a GSM network), a USIM card (e.g., a USIM card in a WCDMA network), or a UIM card (e.g., a UIM card in a CDMA network).

230: The wireless routing device obtains an expected authentication result from the subscriber identity module, where the expected authentication result is generated by the subscriber identity module according to the authentication request parameter and an authentication key that is saved in the subscriber identity module.

For example, the subscriber identity module may execute the same authentication algorithm as that of the network side according to the authentication request parameter, the authentication key and an authentication algorithm that are saved in the subscriber identity module. The wireless routing device may receive, through an AT command response or a self-defined software interface function, the expected authentication result returned by the subscriber identity module.

240: The wireless routing device sends, to the user equipment, a response to the request, where the response includes the expected authentication result.

For example, the wireless routing device may generate a response to the request, and send the response to the user equipment, so that the user equipment uses the WiFi STA capability thereof to access the WiFi communication network based on the expected authentication result. The response may be sent by using the application programming interface.

According to the embodiment of the present invention, the wireless routing device may communicate with the user equipment through a USB interface, WiFi, BLUETOOTH, infrared or network cable interface.

According to the embodiment of the present invention, a wireless routing device may obtain an expected authentication result from a subscriber identity module and send the expected authentication result to a user equipment, so that the user equipment may use the expected authentication result to access a WiFi communication network, thereby making full use of the WiFi capability of the user equipment and reducing complexity and development difficulty of the wireless routing device.

Optionally, as another embodiment, in step 220, the wireless routing device extracts the authentication request parameter from the request and generates a command including the authentication request parameter; and the wireless routing device sends the command to the subscriber identity module, where in step 230, the wireless routing device receives, from the subscriber identity module, a response to the command, the response to the command including the expected authentication result, and in step 240, the wireless routing device extracts the expected authentication result from the response to the command, carries the expected authentication result in the response to the request, and sends the response to the user equipment.

According to the embodiment of the present invention, the command may be an AT command. In step 220, the wireless routing device extracts the authentication request parameter from the request, and generates an AT command including the authentication request parameter; and the wireless routing device sends the AT command to the subscriber identity module, where in step 230, the wireless routing device receives an AT command response including the expected authentication result from the subscriber identity module, and in step 240, the wireless routing device uses an application programming interface to send, to the user equipment, the expected authentication result extracted from the AT command response.

For example, an "AT command" in the 3rd Generation Partnership Project (3GPP) 27.007 international standard may be used. For example, the AT command is implemented by using "AT+CSIM." The embodiment of the present invention is not limited thereto, for example, a reserved command or simplified command of the international standard may be used during implementation.

Optionally, as another embodiment, the above command may be a software interface function. For example, the Mobile WiFi may use a manufacturer-defined software interface function in a wireless router to obtain the expected authentication result, for example, the command may be a C-language interface function, and the response to the command may be a return value of the C-language interface function, for example, an interface function string DoAuth (string rand), where "rand" is an input parameter (e.g., the authentication request parameter), and the return value of the function is in a string format, with content being the response (e.g., the expected authentication result).

Optionally, as another embodiment, before the wireless routing device receives the request from the user equipment, the method of FIG. 2 further includes: connecting, by the wireless routing device, the user equipment to a non-WiFi communication network.

For example, after being powered on, the wireless routing device may first connect to a non-WiFi communication network, for example, a 3G network. The embodiment of the present invention is not limited thereto, and the non-WiFi communication network may also be other non-WiFi communication networks, for example, GSM, WCDMA and LTE communication networks and so on.

Optionally, as another embodiment, the method of FIG. 2 further includes: disconnecting, by the wireless routing device according to a notification of the user equipment, from the non-WiFi communication network.

For example, when the user equipment detects that it enters coverage of the WiFi communication network (e.g., the user equipment receives a signaling message broadcast by a WiFi hotspot), the user equipment may notify the wireless routing device of a disconnection from the non-WiFi communication network. The notification may be dedicated signaling (e.g., a flag bit included in the dedicated signaling is 1 indicating the disconnection from the non-WiFi communication network), or may also be carried through existing signaling (e.g., a flag bit in an information element at a fixed position of the existing signaling is 1 indicating the disconnection from the non-WiFi communication network).

Optionally, as another embodiment, the method of FIG. 2 further includes: disconnecting, by the wireless routing device according to a notification of the user equipment, from the non-WiFi communication network and enabling the wireless routing device to enter a hibernation mode.

For example, when the user equipment detects that it enters the coverage of the WiFi communication network, the user equipment notifies the wireless routing device of a disconnection from the non-WiFi communication network and at same time enter a hibernation mode, thereby reducing power consumption needed by the Mobile WiFi.

Optionally, as another embodiment, the method of FIG. 2 further includes: in a case where the wireless routing device connects other user equipment to the non-WiFi communication network, maintaining, by the wireless routing device, the connection with the non-WiFi communication network when receiving, from the user equipment, a notification of the disconnection from the non-WiFi communication network.

For example, the wireless routing device may connect a plurality of user equipment to a non-WiFi communication network, where some of the user equipment have the WiFi STA function, and some do not have the WiFi STA function. When the wireless routing device hands over the user equipment, which have the WiFi STA function, from the non-WiFi communication network to the WiFi communication network, the connection of other user equipment, which does not have the WiFi STA function, to the non-WiFi communication network should be maintained. In other words, only when all of the user equipment requests to disconnect from the non-WiFi communication network, the wireless routing device disconnects from the non-WiFi communication network.

Optionally, as another embodiment, the method of FIG. 2 further includes: connecting, by the wireless routing device according to a notification of the user equipment, to the non-WiFi communication network.

For example, when the user equipment leaves the coverage of the WiFi communication network (e.g., no signaling message broadcast by the WiFi hotspot is received within a predetermined period of time) the user equipment may notify the wireless routing device of a connection to the non-WiFi communication network. The notification may be dedicated signaling (e.g., a flag bit included in the dedicated signaling is 1 indicating establishment of a connection with the non-WiFi communication network) or may also be carried through existing signaling (e.g., a flag bit in an information element at a fixed position of the existing signaling is 1 indicating establishment of a connection with the non-WiFi communication network). Preferably, the notification may also be an access request of the user equipment for accessing the non-WiFi communication network.

According to the embodiment of the present invention, the non-WiFi communication network includes a second generation mobile communication network, a third generation mobile communication network or a fourth generation mobile communication network.

According to the embodiment of the present invention, in step 210, the wireless routing device receives the request, which is sent by the user equipment, by using an application programming interface and through a USB interface, a WiFi interface, a BLUETOOTH interface, an infrared interface or a network cable interface, and in step 240, the wireless routing device sends, to the user equipment, the response to the request by using the application programming interface and through the USB interface, the WiFi interface, the BLUETOOTH interface, the infrared interface or the network cable interface.

For example, the user equipment may use a software interface protocol such as an application programming interface (API) encapsulation protocol to encapsulate the authentication request parameter into the request, and the wireless routing device may use the software interface protocol such as the API encapsulation protocol to encapsulate the expected authentication result into the response.

According to the embodiment of the present invention, the application programming interface includes an HTTP application programming interface, an HTTPS application programming interface or a Socket application programming interface.

According to the embodiment of the present invention, in a case where the application programming interface includes the HTTP application programming interface or the HTTPS application programming interface, the request is a POST request.

Figure 3:
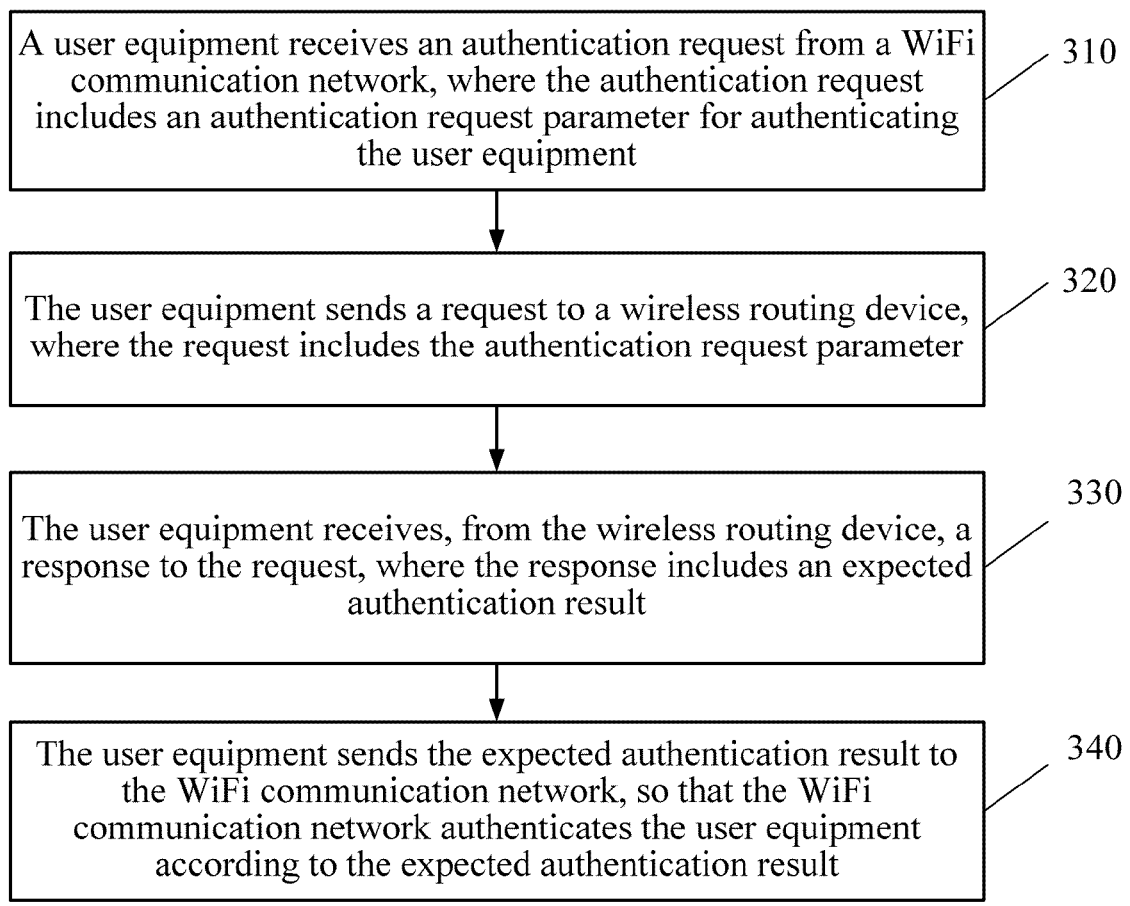
FIG. 3 is a schematic flow chart of a method for implementing WiFi communication according to another embodiment of the present invention.

FIG. 3 is a schematic flow chart of a method for implementing WiFi communication according to another embodiment of the present invention. The method of FIG. 3 is executed by the user equipment 110 of FIG. 1. The method of FIG. 3 is corresponding to the method of FIG. 2, and the details are not described here again.

310: A user equipment receives an authentication request from a WiFi communication network, where the authentication request includes an authentication request parameter for authenticating the user equipment.

For example, when requesting to access the WiFi communication network, the user equipment receives an authentication request including an authentication request parameter sent by the WiFi communication network, where the authentication request parameter may be a random number generated by the WiFi communication network.

320: The user equipment sends a request to a wireless routing device, where the request includes the authentication request parameter.

330: The user equipment receives, from the wireless routing device, a response to the request, where the response includes an expected authentication result, and the expected authentication result is obtained, by a subscriber identity module connected to the wireless routing device, according to the authentication request parameter and an authentication key that is saved in the subscriber identity module.

340: The user equipment sends the expected authentication result to the WiFi communication network, so that the WiFi communication network authenticates the user equipment according to the expected authentication result.

According to the embodiment of the present invention, a user equipment may obtain an expected authentication result from a subscriber identity module through a Mobile WiFi, and use the expected authentication result to access a WiFi communication network, thereby making full use of the WiFi capability of the user equipment, and reducing complexity and development difficulty of the wireless routing device.

Optionally, as another embodiment, the user equipment detects the WiFi communication network, and when it is detected that the user equipment is located within coverage of the WiFi communication network, the user equipment initiates an access request to the WiFi communication network.

Optionally, as another embodiment, before the access request is initiated to the WiFi communication network, the method of FIG. 3 further includes: connecting, by the user equipment, to a non-WiFi communication network through the wireless routing device.

According to the embodiment of the present invention, the non-WiFi communication network includes a second generation mobile communication network, a third generation mobile communication network or a fourth generation mobile communication network.

Optionally, as another embodiment, the method of FIG. 3 further includes: notifying, by the user equipment, the wireless routing device of a disconnection from the non-WiFi communication network.

Optionally, as another embodiment, the user equipment notifies the wireless routing device of a disconnection from the non-WiFi communication network and enables the wireless routing device to enter a hibernation mode.

Optionally, as another embodiment, the method of FIG. 3 further includes: when detecting that the user equipment leaves the coverage of the WiFi communication network and/or the user equipment is disconnected from the WiFi communication network, notifying, by the user equipment, the wireless routing device of a connection to the non-WiFi communication network.

Optionally, as another embodiment, the method of FIG. 3 further includes: after the WiFi communication network successfully authenticates the user equipment, the user equipment accesses the WiFi communication network.

According to the embodiment of the present invention, in step 320, the user equipment sends the request to the wireless routing device by using an application programming interface to and through a USB interface, a WiFi interface, a BLUETOOTH interface, an infrared interface or a network cable interface, and in step 330, the user equipment receives the expected authentication result from the wireless routing device by using the application programming interface and through the USB interface, the WiFi interface, the BLUETOOTH interface, the infrared interface or the network cable interface.

According to the embodiment of the present invention, the application programming interface includes an HTTP application programming interface, an HTTPS application programming interface and a Socket application programming interface.

According to the embodiment of the present invention, in a case where the application programming interface includes the HTTP application programming interface or the HTTPS application programming interface, the request is a POST request.

Figure 4:
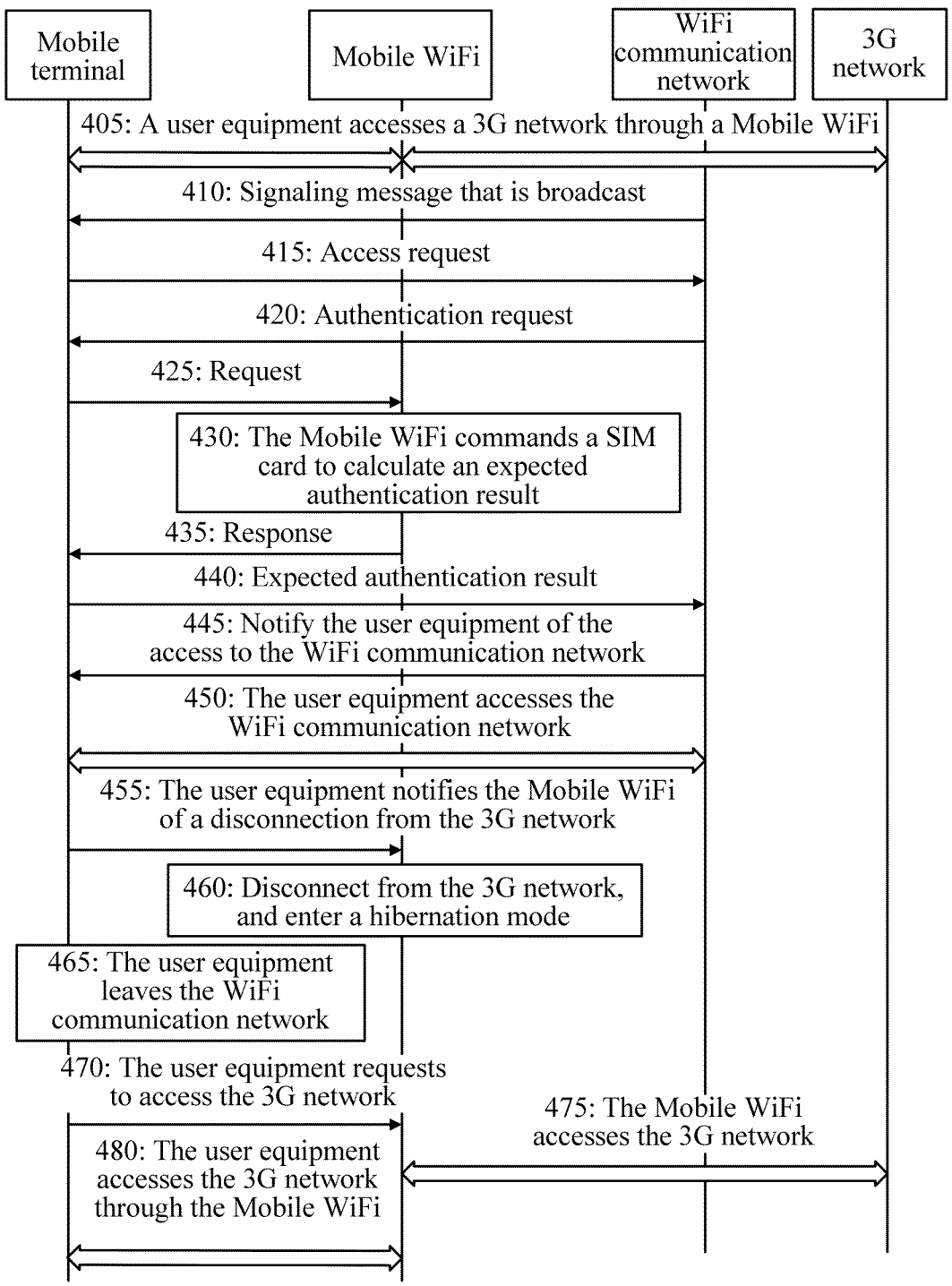
FIG. 4 is a schematic flow chart of a process of implementing WiFi communication according to an embodiment of the present invention.

FIG. 4 is a schematic flow chart of a process of implementing WiFi communication according to an embodiment of the present invention. The embodiment of FIG. 4 is an example of the methods of FIG. 2 and FIG. 3. This embodiment describes a specific process of handover from a 3G network to a WiFi communication network and handover from the WiFi communication network back to the 3G network.

405: Assume that a current user equipment accesses a 3G network through a Mobile WiFi.

For example, when being powered on, the Mobile WiFi may first access the 3G network, so that the user equipment may access the 3G network through the Mobile WiFi. The specific process that the user equipment accesses the 3G network through the Mobile WiFi is a conventional access process, and the details are not described here again.

410: The user equipment detects a signaling message broadcast by a WiFi communication network.

When a user carries the user equipment and the Mobile WiFi to enter an area covered by a WiFi hotspot of a WiFi communication network of an operator, a WiFi STA on the user equipment may determine, by detecting a signaling message broadcast by the WiFi hotspot, whether the WiFi hotspot exists.

415: The user equipment initiates an access request to the WiFi communication network.

For example, after detecting that the WiFi hotspot of the WiFi communication network exists, the user equipment may initiate an access request to the WiFi hotspot.

420: The WiFi communication network initiates an authentication request to the user equipment.

For example, after receiving the access request initiated by the user equipment, the WiFi hotspot in the WiFi communication network may initiate an authentication request to the user equipment, to request the user equipment to implement an authentication process. The authentication request may include an authentication request parameter. An authentication algorithm and an authentication key that are needed in the authentication process are stored in a SIM card built in the Mobile WiFi and are also backed up in the WiFi communication network of the operator. The basic principle of authentication is that expected authentication result=authentication algorithm (authentication key, authentication request parameter). The WiFi communication network of the operator compares an expected authentication result returned by the user equipment with an expected authentication result calculated by the WiFi communication network, and if the expected authentication result is consistent with an expected authentication result calculated by the WiFi communication network, determines that the user equipment is a user equipment having a legal SIM, and accordingly allows the user equipment to access the WiFi communication network.

425: The user equipment sends a request for obtaining the expected authentication result to the Mobile WiFi.

For example, after receiving the authentication request sent by the WiFi communication network, the user equipment extracts the authentication request parameter from the authentication request, and forwards the authentication request parameter to the Mobile WiFi through a request by using the HTTP protocol. According to the embodiment of the present invention, an API encapsulation protocol such as the HTTP protocol may be used to encapsulate the request. An example of the request by using the HTTP protocol is shown by the following HTTP code.

The request sent by the user equipment to the Mobile WiFi may include the following content:

```
POST api/auth HTTP/1.1
<?xml version="1.0" encoding="UTF-8"?>
<request>
   <Rand>xxxxxx</Rand >
</request>
where "xxxxxx" is the authentication request parameter for
calculating the expected authentication result.
```

430: The Mobile WiFi commands a subscriber identity module card to implement calculation of the authentication algorithm, so as to obtain the expected authentication result.

For example, the subscriber identity module card may be installed or built in the Mobile WiFi, and may be a SIM card for a GSM network, a USIM card for a WCDMA network, or a UIM card for a CDMA network. An example that the user equipment reads authentication information (e.g., information stored in the SIM card) from the Mobile WiFi according to the embodiment of the present invention is described in detail below.

After receiving the request from the user equipment, the Mobile WiFi extracts the authentication request parameter from the request, sends the authentication request parameter to the SIM card through an AT command and obtains the expected authentication result from the SIM card.

For example, an "AT command" providing interface in the 3GPP 27.007 international standard may be used, so that the SIM card opens an authentication capability to the Mobile WiFi. For example, "AT+CSIM" is used during implementation, and the command function is strong enough to read almost all information of the SIM card.

According to the embodiment of the present invention, a simplified AT command "AT+AUTH" may also be self-defined. For example, the AT command is in the following format: deliver command: AT+AUTH=<RAND>; report response: <RES>, where <RES>=authentication algorithm (authentication key, <RAND>), and the authentication request parameter <RAND> is a random number. The "authentication key" varies for each SIM card, is preset in the SIM card, and is backed up in a server of an operator. The "authentication algorithm" may be an authentication algorithm conforming to an international standard.

When receiving the AT command, the SIM card at the terminal side may calculate <RES>; meanwhile, the network side also uses the same authentication algorithm to calculate <RES> according to the backed-up authentication key and the authentication request parameter, and if the SIM card is legal, the two calculation results should be the same.

It should be understood that, the Mobile WiFi also may not use the AT command, but instead, use other methods to obtain the expected authentication result from the SIM card. For example, the Mobile WiFi may use a manufacture-defined software interface function in a wireless router (reference may be made to the embodiment of FIG. 5 for details), where the specific process is similar to the process of using the AT command, and the details are not be described here again.

435: The Mobile WiFi returns a response to the user equipment.

For example, after obtaining an AT command response, the Mobile WiFi extracts the expected authentication result from the AT command response and carries the expected authentication result in the response. According to the embodiment of the present invention, the HTTP protocol may be used to encapsulate the response. An example of using the HTTP protocol to encapsulate the AT command response is shown by the following HTTP code.

The response returned by the Mobile WiFi to the user equipment includes the following content:

```
<?xml version="1.0" encoding="UTF-8"?>
<response>yyyyyy</response>
where "yyyyyy" is the expected authentication result.
```

According to the embodiment of the present invention, using the HTTP protocol to encapsulate the request and the response has an advantage of good compatibility.

It should be noted that, the API definition for the HTTP protocol encapsulation of the request and the response provided in this embodiment is an example only, and is simplified for the convenience of description, so as to match the foregoing simplified AT command. In practical implementation, parameters in the interface definition may not be completely the same, and some additional parameters may be added, all of which fall within the protection scope of the present invention.

It should be understood that, according to the embodiment of the present invention, a downlink software interface (e.g., an API encapsulation protocol) of the Mobile WiFi adopts HTTP preferably, but may also adopt other protocols, including, but not limited to, HTTPS, TCP Socket, UDP Socket and so on.

440: The user equipment returns the expected authentication result to the WiFi communication network.

For example, the user equipment may return the expected authentication result to the WiFi hotspot of the operator through an authentication request response.

445: The WiFi communication network notifies the user equipment of the access to the WiFi communication network.

For example, the WiFi hotspot of the operator (including network side equipment at the backend of the WiFi hotspot) compares the expected authentication result received from the user equipment and an expected authentication result calculated at the WiFi communication network side, and if the two are consistent, the authentication succeeds, and the user equipment is notified of the access to the WiFi communication network. Similar to the method for calculating authentication of the SIM card, the expected authentication result at the WiFi communication network side=authentication algorithm (key, parameter in authentication request).

450: The user equipment accesses the WiFi communication network.

For example, after receiving a notification sent by the WiFi hotspot, the user equipment may use the WiFi STA function thereof to access the WiFi communication network directly.

455: The user equipment notifies the Mobile WiFi of a disconnection from the 3G network.

For example, the user equipment may notify the Mobile WiFi of a disconnection from the 3G network after the user equipment accesses the WiFi communication network, so as to maintain continuity of network communication.

460: The Mobile WiFi disconnects from the 3G network and enters a hibernation mode.

For example, after receiving a notification of the user equipment, the Mobile WiFi disconnects the connection previously established with the 3G network and enters the hibernation mode. In the hibernation mode, the Mobile WiFi may enter a low power consumption state and may be awakened by the user equipment as needed.

Optionally, as another embodiment, the Mobile WiFi does not enter the hibernation mode after disconnecting from the 3G network, that is, does not support the hibernation mode, so that the Mobile WiFi may be connected to the 3G network in time as needed.

465: The user equipment leaves the WiFi communication network.

For example, after the user equipment accesses the WiFi communication network for a period of time, the user may carry the user equipment and the Mobile WiFi to leave the area covered by the WiFi hotspot of the operator, in this case, the connection between the user equipment and the WiFi communication network is disconnected automatically.

470: The user equipment requests to access the 3G network.

For example, the user equipment sends a connection request to the Mobile WiFi, to request to access the 3G network.

Optionally, in a case where the Mobile WiFi is in hibernation, the user equipment may send a connection request to awaken the Mobile WiFi in hibernation, and request to access the 3G network.

475: The Mobile WiFi accesses the 3G network.

For example, after receiving the connection request of the user equipment, the Mobile WiFi accesses the 3G network. The process that the Mobile WiFi accesses the 3G network may be similar to a conventional access process, and the details are not described here again.

480: The user equipment accesses the 3G network through the Mobile WiFi.

After the Mobile WiFi accesses the 3G network, the user equipment may access the 3G network through the Mobile WiFi.

The embodiment of the present invention makes full use of the WiFi STA capability of the user equipment, achieves better user experience, and does not need the Mobile WiFi to have the WiFi STA function in the uplink direction, thereby reducing complexity and development difficulty of the Mobile WiFi. Because the Mobile WiFi may be in the hibernation state when the user equipment accesses the WiFi communication network, the power consumption needed by the Mobile WiFi is reduced. In addition, because the function of accessing the WiFi communication network is implemented in the user equipment rather than the Mobile WiFi, interference of WiFi signals is reduced.

It should be understood that, the embodiment of the present invention may only include the process of handover from the 3G network to the WiFi communication network or the process of handover from the WiFi communication network to the 3G network.

It should be further understood that, the embodiments of the present invention are not limited to the execution sequence of the embodiment of FIG. 4. Optionally, as another embodiment, step 450 may be executed after step 460. In other words, according to the embodiments of the present invention, the Mobile WiFi may connect to the WiFi communication network after disconnecting from the 3G network or at the same time when disconnecting from the 3G network.

It should be further understood that, the embodiment of the present invention is illustrated through an example where the Mobile WiFi is connected to the 3G network in the uplink direction, but the embodiment of the present invention is not limited thereto, for example, the Mobile WiFi may also use various non-WiFi access modes such as 2G and 4G in the uplink direction.

It should be further understood that, the downlink connection mode of the Mobile WiFi may also be BLUETOOTH, infrared or network port connection mode, in addition to USB and WiFi.

It should be further understood that, in a case where a 3G network card is used instead of the Mobile WiFi, the 3G network card may be connected to a portable computer through a USB interface, where the 3G network card is connected to the 3G network in the uplink direction and connected to the user equipment through a USB in the downlink direction and has a 3G SIM card supporting WiFi authentication. Client software may be developed on a portable computer having the WiFi STA function to manage handover between 3G and WiFi in a centralized manner. When the user equipment accesses the WiFi communication network of the operator (requiring SIM card authentication), authentication information of the SIM card may be read through the method according to the embodiment of the present invention, thereby completing an entire WiFi offload process.

Figure 5:
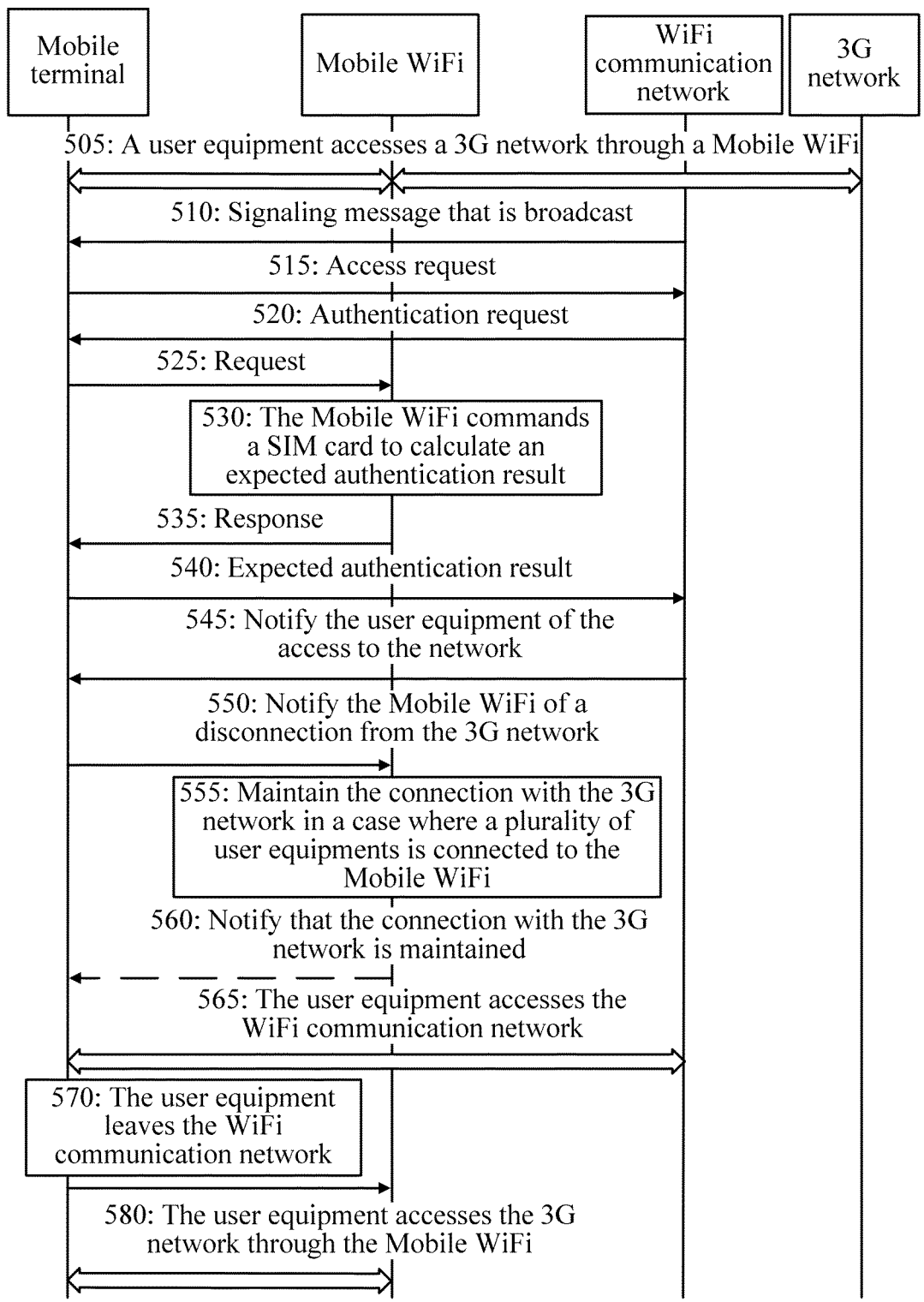
FIG. 5 is a schematic flow chart of a process of implementing WiFi communication according to another embodiment of the present invention.

FIG. 5 is a schematic flow chart of a process of implementing WiFi communication according to another embodiment of the present invention. The embodiment of FIG. 5 is another example of the methods of FIG. 2 and FIG. 3. This embodiment describes a specific process of handover from a 3G network to a WiFi communication network and handover from the WiFi communication network back to the 3G network. Step 505 to step 525 of FIG. 5 are similar to step 405 to step 425 of FIG. 4, and the details are not described here again.

505: Assume that a current user equipment accesses a 3G network through a Mobile WiFi.

510: The user equipment detects a signaling message broadcast by a WiFi communication network.

515: The user equipment initiates an access request to the WiFi communication network.

520: The WiFi communication network initiates an authentication request to the user equipment.

525: The user equipment sends a request for obtaining the expected authentication result to the Mobile WiFi.

530: The Mobile WiFi commands a subscriber identity module card to implement calculation of the authentication algorithm, so as to obtain the expected authentication result.

After receiving the request from the user equipment, the Mobile WiFi extracts the authentication request parameter from the request and sends the authentication request parameter to the SIM card through a command, so as to obtain, from the SIM card, a response to the command, where the response includes the expected authentication result.

For example, the Mobile WiFi may use a manufacturer-defined software interface function in the Mobile WiFi (e.g., a wireless router), for example, a C-language interface function, such as an interface function string DoAuth (string rand), where "rand" is an input authentication request parameter, and a return value of the function is in a string format, with content being the expected authentication result.

535: The Mobile WiFi returns a response to the user equipment. This is similar to step 435 of FIG. 4, except that the Mobile WiFi extracts the expected authentication result from the response to the command.

540: The user equipment returns the expected authentication result to the WiFi communication network. This is similar to step 440 of FIG. 4, and the details are not described here again.

545: The WiFi communication network notifies the user equipment of the access to the WiFi communication network. This is similar to step 445 of FIG. 4, and the details are not described here again.

550: The user equipment notifies the Mobile WiFi of a disconnection from the 3G network.

555: The Mobile WiFi maintains the connection with the 3G network in a case where a plurality of user equipment is connected to the Mobile WiFi.

After receiving a notification, which is sent by the user equipment, of disconnection from the 3G network, the Mobile WiFi may judge whether other user equipment are connected to the 3G network through the Mobile WiFi, and if yes, maintain the connection with the 3G network. For example, some user equipment of the user does not have the mobile STA function, and still need to be connected to the 3G network through the Mobile WiFi.

Optionally, as another embodiment, the Mobile WiFi disconnects from the 3G network only after receiving, from all the user equipment, notifications of the disconnection from the 3G network.

560: The Mobile WiFi notifies the user equipment that the Mobile WiFi still maintains the connection with the 3G network. Step 560 is optional, and the Mobile WiFi may also not notify that the connection to the 3G network is still maintained.

565: The user equipment accesses the WiFi communication network.

For example, after receiving, from the WiFi hotspot, a notification that the authentication succeeds, the user equipment may use the WiFi STA function thereof to access the WiFi communication network.

570: The user equipment leaves the WiFi communication network.

For example, after the user equipment accesses the WiFi communication network for a period of time, the user may carry the user equipment and the Mobile WiFi to leave the area covered by the WiFi hotspot of the operator, in this case, the connection between the user equipment and the WiFi communication network is disconnected automatically.

575: The user equipment accesses the 3G network through the Mobile WiFi.

Because the Mobile WiFi maintains the connection to the 3G network, the user equipment may access the 3G network through the Mobile WiFi after leaving the WiFi communication network.

The method for implementing WiFi communication according to the embodiments of the present invention is described above, and a wireless routing device and a user equipment according to the embodiments of the present invention are described below respectively with reference to FIG. 6 and FIG. 7.

Figure 6:
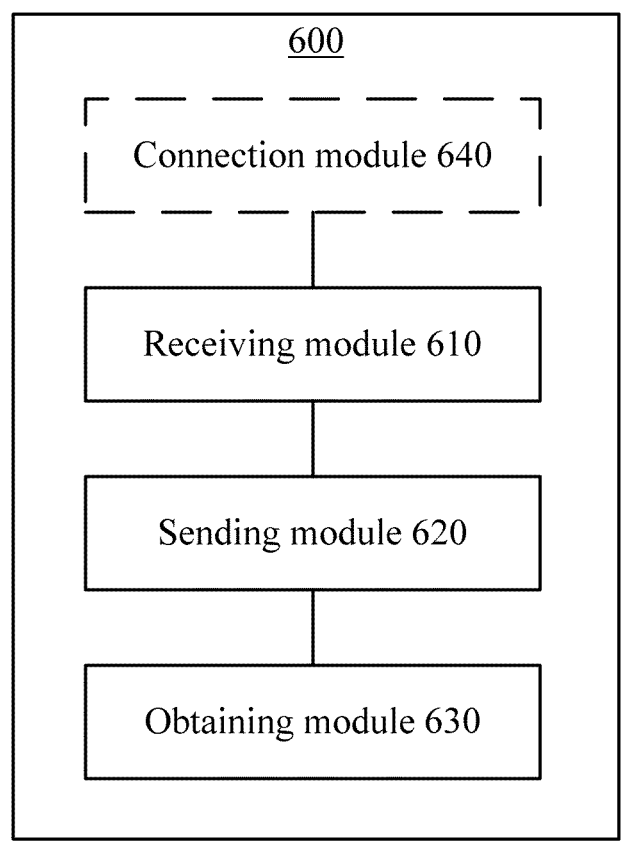
FIG. 6 is a schematic structural diagram of a wireless routing device according to an embodiment of the present invention.

FIG. 6 is a schematic structural diagram of a wireless routing device 600 according to an embodiment of the present invention. The wireless routing device 600 includes a receiving module 610, a sending module 620 and an obtaining module 630.

The receiving module 610 receives a request sent by a user equipment, where the request includes an authentication request parameter for authenticating the user equipment. The sending module 620 sends the authentication request parameter to a subscriber identity module. The obtaining module 630 obtains an expected authentication result from the subscriber identity module, where the expected authentication result is generated by the subscriber identity module according to the authentication request parameter and an authentication key that is saved in the subscriber identity module. The sending module 620 sends a response to the request to the user equipment, where the response includes the expected authentication result.

According to the embodiment of the present invention, a wireless routing device may obtain an expected authentication result from a subscriber identity module, and send the expected authentication result to a user equipment, so that the user equipment may use the expected authentication result to access a WiFi communication network, thereby making full use of the WiFi capability of the user equipment, and reducing complexity and development difficulty of the wireless routing device.

According to the embodiment of the present invention, the sending module 620 extracts the authentication request parameter from the request, generates a command including the authentication request parameter, and sends the command to the subscriber identity module, where the obtaining module 630 receives, from the subscriber identity module, a response to the command, where the response to the command includes the expected authentication result, and the sending module 620 extracts the expected authentication result from the response to the command, carries the expected authentication result in a response to the request, and sends the response to the user equipment.

According to the embodiment of the present invention, the command is an AT command.

Optionally, as another embodiment, a connection module 640 is further included. The connection module 640 connects the user equipment to a non-WiFi communication network before the receiving module 610 receives the request from the user equipment.

Optionally, as another embodiment, the connection module 640 is further configured to disconnect from a non-WiFi communication network according to a notification of the user equipment; or, configured to disconnect from the non-WiFi communication network according to a notification of the user equipment and enable the wireless routing device to enter a hibernation mode; or configured to: maintain the connection with the non-WiFi communication network in a case where the wireless routing device connects other user equipment to the non-WiFi communication network and when the connection module 640 receives a notification of the user equipment that the connection module 640 disconnects from the non-WiFi communication network.

Optionally, as another embodiment, the connection module 640 is further configured to connect to the non-WiFi communication network according to a notification of the user equipment.

According to the embodiment of the present invention, the non-WiFi communication network includes a second generation mobile communication network, a third generation mobile communication network or a fourth generation mobile communication network.

According to the embodiment of the present invention, the receiving module 610 receives the request, which is sent by the user equipment, by using an application programming interface and through a USB interface, a WiFi interface, a BLUETOOTH interface, an infrared interface or a network cable interface, and the sending module 620 sends the response to the request to the user equipment by using the application programming interface and through the universal serial bus USB interface, the WiFi interface, the BLUETOOTH interface, the infrared interface or the network cable interface.

According to the embodiment of the present invention, the application programming interface includes an HTTP application programming interface, an HTTPS application programming interface or a Socket application programming interface.

For the operations and functions of each unit of the wireless routing device 600, reference may be made to the method of FIG. 2, and to avoid repetition, the details are not described here again.

Figure 7:
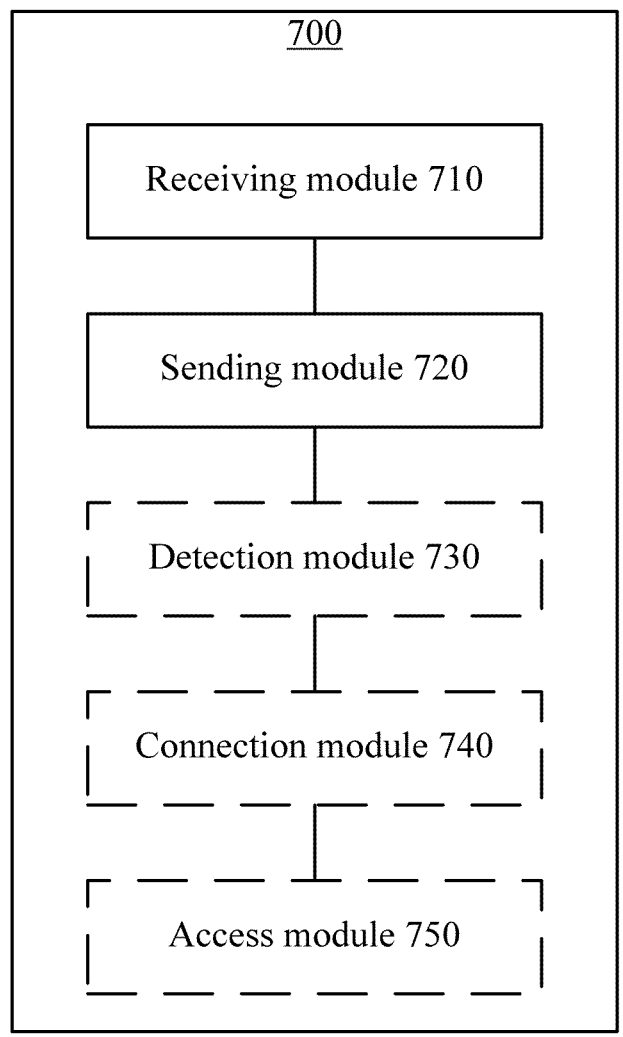
FIG. 7 is a schematic structural diagram of a user equipment according to another embodiment of the present invention.

FIG. 7 is a schematic structural diagram of a user equipment 700 according to another embodiment of the present invention. The user equipment 700 includes a receiving module 710 and a sending module 720.

The receiving module 710 is configured to receive an authentication request from a WiFi communication network, and receive, from a wireless routing device, a response to the request, where the authentication request includes an authentication request parameter for authenticating the user equipment, and the response includes an expected authentication result. The sending module 720 is configured to send a request to the wireless routing device, and send the expected authentication result to the WiFi communication network, so that the WiFi communication network authenticates the user equipment according to the expected authentication result, where the request includes the authentication request parameter, and the expected authentication result is generated by a subscriber identity module connected to the wireless routing device according to the authentication request parameter and an authentication key saved in the subscriber identity module.

The user equipment according to the embodiment of the present invention may obtain an expected authentication result from a subscriber identity module through a Mobile WiFi and use the expected authentication result to access a WiFi communication network, thereby making full use of the WiFi capability of the user equipment, and reducing complexity and development difficulty of the wireless routing device.

Optionally, as another embodiment, the user equipment 700 further includes a detection module 730 and a connection module 740. The detection module 730 detects the WiFi communication network. The connection module 740 initiates an access request to the WiFi communication network when the detection module 730 detects that the user equipment 700 is located within coverage of the WiFi communication network.

Optionally, as another embodiment, the connection module 710 is further configured to connect to a non-WiFi communication network through the wireless routing device before initiating the access request to the WiFi communication network.

According to the embodiment of the present invention, the non-WiFi communication network includes a second generation mobile communication network, a third generation mobile communication network or a fourth generation mobile communication network.

Optionally, as another embodiment, the connection module 710 is further configured to notify the wireless routing device of a disconnection from the non-WiFi communication network.

Optionally, as another embodiment, the connection module 710 is further configured to notify the wireless routing device of a disconnection from the non-WiFi communication network and enable the wireless routing device to enter a hibernation mode.

Optionally, as another embodiment, the connection module 710 is further configured to notify the wireless routing device of a connection to the non-WiFi communication network when the detection module 730 detects that the user equipment leaves the coverage of the WiFi communication network and/or the user equipment is disconnected from the WiFi communication network.

Optionally, as another embodiment, the user equipment 700 further includes an access module 750. The access module 750 accesses the WiFi communication network after the WiFi communication network successfully authenticates the user equipment.

According to the embodiment of the present invention, the sending module 720 sends the request to the wireless routing device by using an application programming interface and through a USB interface, a WiFi interface, a BLUETOOTH interface, an infrared interface or a network cable interface, and the receiving module 710 receives the expected authentication result from the wireless routing device by using the application programming interface and through the USB interface, the WiFi interface, the BLUETOOTH interface, the infrared interface or the network cable interface.

According to the embodiment of the present invention, the application programming interface includes an HTTP application programming interface, an HTTPS application programming interface or a Socket application programming interface.

For the operations and functions of each unit of the user equipment 700, reference may be made to the method of FIG. 3, and to avoid repetition, the details are not described here again.

It should be noted that, the subscriber identity module (e.g., a SIM card, a USIM card or a UIM card) and the WiFi communication network in the above embodiments may be provided by the same operator, and definitely, the subscriber identity module and the WiFi communication network may also be provided by different operators, for example, operators may sign a roaming protocol, so that a subscriber identity module provided by one operator may perform authentication with a WiFi communication network provided by another operator.

Persons skilled in the art should appreciate that, in combination with the examples described in the embodiments here, units and algorithm steps can be implemented by electronic hardware, or a combination of computer software and electronic hardware. Whether the functions are executed by hardware or software depends on particular applications and design constraints of the technical solutions. Person skilled in the art may use different methods to implement the described functions for every particular application, but it should not be considered that the implementation goes beyond the scope of the present invention.

It may be clearly understood by persons skilled in the art that, for the purpose of convenient and brief description, for a detailed working process of the foregoing system, apparatus and unit, reference may be made to the corresponding process in the method embodiments, and the details are not described here again.

In the embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections are implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network elements. A part or all of the units may be selected according to actual needs to achieve the objectives of the solutions of the embodiments.

In addition, functional units in the embodiments of the present invention may be integrated into a processing unit, or each of the units may exist alone physically, or two or more units are integrated into a unit.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in the form of a software product. The computer software product is stored in a storage medium and includes several instructions for instructing a computer device (e.g., a personal computer, a server, a network device, and the like) to execute all or part of the steps of the methods described in the embodiments of the present invention. The storage medium includes: any medium that can store program codes, such as a U-disk, a removable hard disk, a read-only memory (ROM), a random access memory (RAM), a magnetic disk, or an optical disk.

The foregoing descriptions are merely exemplary embodiments of the present invention, but not intended to limit the present invention. Any variations or replacement made by persons skilled in the art without departing from the spirit of the present invention shall fall within the protection scope of the present invention. Therefore, the protection scope of the present invention shall be subject to the appended claims.

What is claimed is:

1. A method for implementing wireless fidelity (WiFi) communication comprising:

accessing, by a wireless routing device, a mobile communication network, wherein the mobile communication network is different from a WiFi communication network such that a user equipment accesses the mobile communication network by using the wireless routing device;

receiving, by the wireless routing device, a request sent by the user equipment, wherein the request comprises an authentication request parameter for the WiFi communication network to authenticate the user equipment;

sending, by the wireless routing device, the authentication request parameter to a subscriber identity module, wherein the subscriber identity module is in the wireless routing device;

obtaining, by the wireless routing device, an expected authentication result from the subscriber identity module, wherein the expected authentication result is generated by the subscriber identity module according to the authentication request parameter and an authentication key saved in the subscriber identity module; and sending, by the wireless routing device, a response to the request to the user equipment, wherein the response comprises the expected authentication result, and wherein the expected authentication result is returned to the WiFi communication network by the user equipment.

2. The method according to claim 1, wherein sending, by the wireless routing device, the authentication request parameter to the subscriber identity module comprises:

extracting, by the wireless routing device, the authentication request parameter from the request;

generating a command comprising the authentication request parameter; and sending, by the wireless routing device, the command to the subscriber identity module, wherein obtaining, by the wireless routing device, the expected authentication result from the subscriber identity module comprises receiving, by the wireless routing device and from the subscriber identity module, a response to the command, wherein the response to the command comprises the expected authentication result, and wherein sending, by the wireless routing device, the response to the request to the user equipment comprises extracting, by the wireless routing device, the expected authentication result from the response to the command, carrying the expected authentication result in a response to the request, and sending the response to the user equipment.

3. The method according to claim 2, wherein the command is an attention (AT) command.

4. The method according to claim 1, wherein receiving, by the wireless routing device, the request sent by the user equipment comprises receiving, by the wireless routing device, the request sent by the user equipment, by using an application programming interface, wherein the request is received through a universal serial bus (USB) interface, a WiFi interface, a BLUETOOTH interface, an infrared interface or a network cable interface, wherein sending, by the wireless routing device, the response to the request to the user equipment comprises sending, by the wireless routing device, the response to the request to the user equipment by using the application programming interface, and wherein the response is sent through the USB interface, the WiFi interface, the BLUETOOTH interface, the infrared interface or the network cable interface.

5. The method according to claim 4, wherein the application programming interface comprises a hypertext transfer protocol (HTTP) application programming interface, a hypertext transfer protocol over secure socket layer (HTTPS) application programming interface or a Socket application programming interface.

6. A method for implementing wireless fidelity (WiFi) communication comprising:
   accessing, by a user equipment, a mobile communication network by using a wireless routing device, wherein the mobile communication network is different from a WiFi communication network;
   detecting, by the user equipment, a signaling message broadcast by the WiFi communication network;
   initiating, by the user equipment, an access request to the WiFi communication network;
   receiving, by the user equipment, an authentication request from the WiFi communication network, wherein the authentication request comprises an authentication request parameter for the WiFi communication network to authenticate the user equipment;
   sending, by the user equipment, a request to the wireless routing device, wherein the request comprises the authentication request parameter;
   receiving, by the user equipment, response sent from the wireless routing device, wherein the response comprises an expected authentication result, and wherein the wireless routing device obtains the expected authentication result from a subscriber identity module in the wireless routing device; and
   sending, by the user equipment, the expected authentication result to the WiFi communication network such that the WiFi communication network authenticates the user equipment according to the expected authentication result; and
   accessing, by the user equipment, the WiFi communication network.

7. The method according to claim 6, wherein sending, by the user equipment, the request to the wireless routing device comprises sending, by the user equipment, the request to the wireless routing device by using an application programming interface, wherein the request is sent through a universal serial bus (USB) interface, a WiFi interface, a BLUETOOTH interface, an infrared interface or a network cable interface, wherein receiving, by the user equipment, the expected authentication result from the wireless routing device comprises receiving, by the user equipment, the expected authentication result from the wireless routing device by using the application programming interface, and wherein the expected authentication result is received through the USB interface, the WiFi interface, the BLUETOOTH interface, the infrared interface or the network cable interface.

8. The method according to claim 7, wherein the application programming interface comprises a hypertext transfer protocol (HTTP) application programming interface, a hypertext transfer protocol over secure socket layer (HTTPS) application programming interface or a Socket application programming interface.

9. A wireless routing device comprising:
   a receiving module configured to receive a request sent by a user equipment, wherein the request comprises an authentication request parameter for a wireless fidelity (WiFi) communication network to authenticate the user equipment, wherein the wireless routing device accesses a mobile communication network, wherein the mobile communication network is different from the WiFi communication network such that the user equipment accesses the mobile communication network by using the wireless routing device;
   a sending module configured to send the authentication request parameter to a subscriber identity module and send a response to the request to the user equipment, wherein the response comprises an expected authentication result, wherein the expected authentication result is returned to the WiFi communication network by the user equipment, and wherein the subscriber identity module is in the wireless routing device; and
   an obtaining module configured to obtain the expected authentication result from the subscriber identity module, wherein the expected authentication result is generated by the subscriber identity module according to the authentication request parameter and an authentication key saved in the subscriber identity module.

10. The wireless routing device according to claim 9, wherein the sending module extracts the authentication request parameter from the request, generates a command comprising the authentication request parameter, and sends the command to the subscriber identity module, wherein the obtaining module receives, from the subscriber identity module, a response to the command, wherein the response to the command comprises the expected authentication result, and wherein the sending module extracts the expected authentication result from the response to the command, carries the expected authentication result in a response to the request, and sends the response to the user equipment.

11. The wireless routing device according to claim 10, wherein the command is an attention (AT) command.

12. The wireless routing device according to claim 9, wherein the receiving module receives the request sent by the user equipment, by using an application programming interface, wherein the receiving module receives the request through a universal serial bus (USB) interface, a WiFi interface, a BLUETOOTH interface, an infrared interface or a network cable interface, wherein the sending module sends the response to the request to the user equipment by using the application programming interface, and wherein the sending module sends the response through the USB interface, the WiFi interface, the BLUETOOTH interface, the infrared interface or the network cable interface.

13. The wireless routing device according to claim 12, wherein the application programming interface comprises a hypertext transfer protocol (HTTP) application programming interface, a hypertext transfer protocol over secure socket layer (HTTPS) application programming interface or a Socket application programming interface.

14. A user equipment comprising:
   a receiving module configured to receive an authentication request from a wireless fidelity (WiFi) communication network after a signaling message broadcast b the WiFi communication network is detected by the user equipment and an access request is initiated to the WiFi communication network by the user equipment, and receive, a response sent from a wireless routing device, wherein the user equipment accesses a mobile communication network by using the wireless routing device, wherein the mobile communication network is different from the WiFi communication network, wherein the authentication request comprises an authentication request parameter for the WiFi communication network to authenticate the user equipment, wherein the response comprises an expected authentication result; and a sending module configured to send a request to the wireless routing device and send the expected authentication result to the WiFi communication network such that the WiFi communication network authenticates the user equipment according to the expected authentication result, wherein the request comprises the authentication request parameter, and wherein the expected authentication result is used for the user equipment to access the WiFi communication network, and wherein the wireless routing device obtains the expected authentication result from a subscriber identity module in the wireless routing device.

15. The user equipment according to claim 14, wherein the sending module sends the request to the wireless routing device by using an application programming interface, wherein the send module send the request through a universal serial bus (USB) interface, a WiFi interface, a BLUETOOTH interface, an infrared interface or a network cable interface, wherein the receiving module receives the expected authentication result from the wireless routing device by using the application programming interface, and wherein the receiving module receives the expected authentication result through the USB interface, the WiFi interface, the BLUETOOTH interface, the infrared interface or the network cable interface.

16. The user equipment according to claim 15, wherein the application programming interface comprises a hypertext transfer protocol (HTTP) application programming interface, a hypertext transfer protocol over secure socket layer (HTTPS) application programming interface or a Socket application programming interface.

* * * * *

UNITED STATES PATENT AND TRADEMARK OFFICE
CERTIFICATE OF CORRECTION

| | | |
|---|---|---|
| PATENT NO. | : 9,072,118 B2 | Page 1 of 1 |
| APPLICATION NO. | : 13/725523 | |
| DATED | : June 30, 2015 | |
| INVENTOR(S) | : Zhen Zhong | |

It is certified that error appears in the above-identified patent and that said Letters Patent is hereby corrected as shown below:

Claims

Column 22, Line 38, Claim 6 should read:

A method for implementing wireless fidelity (WiFi) communication comprising:
  accessing, by a user equipment, a mobile communication network by using a wireless routing device, wherein the mobile communication network is different from a WiFi communication network;
  detecting, by the user equipment, a signaling message broadcast by the WiFi communication network;
initiating, by the user equipment, an access request to the WiFi communication network;
  receiving, by the user equipment, an authentication request from the WiFi communication network, wherein the authentication request comprises an authentication request parameter for the WiFi communication network to authenticate the user equipment;
  sending, by the user equipment, a request to the wireless routing device, wherein the request comprises the authentication request parameter;
  receiving, by the user equipment, a response sent from the wireless routing device, wherein the response comprises an expected authentication result, and wherein the wireless routing device obtains the expected authentication result from a subscriber identity module in the wireless routing device; and
  sending, by the user equipment, the expected authentication result to the WiFi communication network such that the WiFi communication network authenticates the user equipment according to the expected authentication result; and
  accessing, by the user equipment, the WiFi communication network.

Signed and Sealed this
Twenty-sixth Day of January, 2016

Michelle K. Lee
*Director of the United States Patent and Trademark Office*